US010388168B2

United States Patent
Deragården et al.

(10) Patent No.: US 10,388,168 B2
(45) Date of Patent: Aug. 20, 2019

(54) METHOD OF CONTROLLING INTER-VEHICLE GAP(S) IN A PLATOON

(71) Applicant: VOLVO TRUCK CORPORATION, Göteborg (SE)

(72) Inventors: Hans Deragården, Kullavik (SE); Lennart Cider, Mölndal (SE)

(73) Assignee: Volvo Truck Corporation, Göteborg (SE)

(*) Notice: Subject to any disclaimer, the term of this patent is extended or adjusted under 35 U.S.C. 154(b) by 0 days.

(21) Appl. No.: 15/553,385

(22) PCT Filed: Feb. 26, 2015

(86) PCT No.: PCT/EP2015/054029
§ 371 (c)(1),
(2) Date: Aug. 24, 2017

(87) PCT Pub. No.: WO2016/134770
PCT Pub. Date: Sep. 1, 2016

(65) Prior Publication Data
US 2018/0137763 A1 May 17, 2018

(51) Int. Cl.
*G08G 1/00* (2006.01)
*G05D 1/02* (2006.01)
(Continued)

(52) U.S. Cl.
CPC ........... *G08G 1/22* (2013.01); *B60R 16/0233* (2013.01); *B60W 10/10* (2013.01); *B60W 10/18* (2013.01);
(Continued)

(58) Field of Classification Search
CPC ...... G05D 1/0287; G05D 1/0295; G08G 1/16; G08G 1/00; G08G 1/22; B60W 30/16; B60W 30/165; B60W 10/10
(Continued)

(56) References Cited

U.S. PATENT DOCUMENTS

| 6,032,097 A | 2/2000 | Iihohshi | |
| 6,208,106 B1 * | 3/2001 | Sielagoski | B60K 31/0008 |
| | | | 123/349 |

(Continued)

FOREIGN PATENT DOCUMENTS

| EP | 2390744 A1 | 11/2011 |
| JP | 2000330637 A | 11/2000 |

(Continued)

OTHER PUBLICATIONS

International Search Report (dated Nov. 20, 2015) for corresponding International App. PCT/EP2015/054029.
(Continued)

*Primary Examiner* — Isaac G Smith
(74) *Attorney, Agent, or Firm* — WRB-IP LLP

(57) ABSTRACT

A method of controlling inter-vehicle gap(s) in a platoon that includes a lead vehicle and one or more following vehicles includes the steps of: obtaining an indicator of a potential collision threat identified by an autonomous emergency braking system of the lead vehicle, wherein the autonomous emergency braking system of the lead vehicle includes pre-defined control phases, and wherein the indicator at least partly determines a current control phase of the autonomous emergency braking system; and sending the obtained indicator to the one or more following vehicles.

9 Claims, 6 Drawing Sheets

(51) Int. Cl.
*G08G 1/16* (2006.01)
*B60W 10/10* (2012.01)
*B60W 10/18* (2012.01)
*B60W 30/16* (2012.01)
*B60W 30/165* (2012.01)
*G05D 1/00* (2006.01)
*B60R 16/023* (2006.01)

(52) U.S. Cl.
CPC .......... *B60W 30/16* (2013.01); *B60W 30/162* (2013.01); *B60W 30/165* (2013.01); *G05D 1/0088* (2013.01); *G05D 1/0278* (2013.01); *G05D 1/0293* (2013.01); *G05D 1/0295* (2013.01); *G08G 1/161* (2013.01); *B60W 2300/10* (2013.01); *B60W 2300/125* (2013.01); *B60W 2550/10* (2013.01); *B60W 2550/408* (2013.01); *B60W 2710/18* (2013.01); *G05D 2201/0213* (2013.01)

(58) Field of Classification Search
USPC ..................................................... 701/96, 93
See application file for complete search history.

(56) References Cited

U.S. PATENT DOCUMENTS

| | | | |
|---|---|---|---|
| 6,437,688 B1* | 8/2002 | Kobayashi | G01S 15/931 180/167 |
| 2009/0210114 A1 | 8/2009 | Baumann et al. | |
| 2010/0134320 A1 | 6/2010 | Chevion et al. | |
| 2011/0270513 A1* | 11/2011 | Shida | B60W 30/165 701/117 |
| 2011/0270514 A1 | 11/2011 | Shida | |
| 2012/0109421 A1 | 5/2012 | Scarola | |
| 2013/0041576 A1* | 2/2013 | Switkes | G08G 1/166 701/123 |
| 2013/0211624 A1 | 8/2013 | Lind et al. | |
| 2014/0282093 A1* | 9/2014 | Burke | H04W 4/029 715/753 |
| 2014/0315865 A1 | 10/2014 | Maciag et al. | |

FOREIGN PATENT DOCUMENTS

| | | |
|---|---|---|
| JP | 2001233086 A | 8/2001 |
| JP | 2009035067 A | 2/2009 |
| JP | 2011219056 A | 4/2011 |
| WO | 2013006826 A2 | 1/2013 |
| WO | 2013147684 A1 | 10/2013 |
| WO | 2014003630 A1 | 1/2014 |

OTHER PUBLICATIONS

International Preliminary Report on Patentability (dated Jun. 16, 2017) for corresponding International App. PCT/EP2015/054029.
Japanese Official Action (dated Feb. 19, 2019) for corresponding Japanese Application 2017-545270.

* cited by examiner

METHOD OF CONTROLLING INTER-VEHICLE GAP(S) IN A PLATOON

BACKGROUND AND SUMMARY

The invention relates to a method of controlling inter-vehicle gap(s) in a platoon comprising a lead vehicle and one or more following vehicles. The invention also relates to a computer program, a computer readable medium, and a control unit for controlling inter-vehicle gap(s) in a platoon. The invention can for example be applied in heavy-duty vehicles, such as trucks and buses.

Automotive industry, research industry and others have explored possibilities to drive road vehicles in so called "platoons" or "road trains" with small time gaps mainly in order to save fuel but also to decrease driver workload and road footprint. The small time gap is enabled by vehicle-to-vehicle (V2V) communication and automation of longitudinal control. The level of both longitudinal and lateral control can differ between different platooning concepts and road environments.

Normally, the lead vehicle in the platoon strives to maintain a target speed and the vehicles behind in the platoon aims to copy the longitudinal control with the additional constraint to maintain the time gap to the vehicle in front in case it for some reason should not be able to adopt its speed to the lead vehicle. However, risks of too long response time of the V2V communication and too varying brake performance of the vehicles in the platoon may make the desired time gap sizes impossible.

WO2013/147684 discloses a method for spacing adjustment in a moving vehicle train formed of at least two vehicles, comprising the steps of continuously maintaining communication between the train's vehicles, continuously determining parameters which characterise the train's journey, and using parameters thus determined as a basis for determining suitable mutual spacing for the train's vehicles, wherein the step of determining said suitable mutual spacing of the train's vehicles comprises the step of using identified risk factors with a probability indication for each risk factor as a basis for evaluating the risk generated by said risk factors and adjusting said spacing accordingly. A local factor incorporation means which take account of local factors in relation to the vehicle train's journey comprise traffic situation determination means for determining prevailing and/or expected traffic situations in relation to the journey of the train's vehicles which might affect safety with regard to the spacing between the vehicles and might thus constitute a risk factor. The traffic situation determination means comprise sensor means situated on board vehicles in the train to monitor other vehicles in their vicinity and other objects such as other road users, e.g. cyclists or pedestrians or obstacles to, for example, the train's leading vehicle. However, a drawback with WO2013/147684 is that the incorporation of a probability indication, such as "slight", for each risk factor can make the method imprecise and unpredictable. Imprecise and unpredictable risk factor assessments may yield a "just-to-be-safe" margin which often will degrade the gain of platooning and cooperative ACC (adaptive cruise control) by larger following gaps and more frequent dissolving.

It is desirable to provide an improved method of controlling inter-vehicle gap(s) in a platoon, which method may overcome or at least alleviate the above-mentioned and other drawbacks.

According to a first aspect of the invention, there is provided a method of controlling inter-vehicle gap(s) in a platoon comprising a lead vehicle and one or more following vehicles, wherein the method comprises the steps of: obtaining an indicator of a potential collision threat identified by an autonomous emergency braking system of the lead vehicle, wherein the autonomous emergency braking system of the lead vehicle comprises pre-defined control phases, and wherein the indicator at least partly determines a current control phase of the autonomous emergency braking system; and sending the obtained indicator to the one or more following vehicles. These steps may be performed by the lead vehicle.

The pre-defined control phases of the autonomous emergency braking system may for example be standardized or statutory. The present invention is based on the understanding that by sending said indicator obtained from the lead vehicle's autonomous emergency braking system to the following vehicle(s), the following vehicle(s) can due to the pre-defined control phases of the autonomous emergency braking system predict what the lead vehicle will do and take appropriate pre-emptive action. The method may further comprise: receiving, in the one or more following vehicles, said indicator; and automatically adjusting the inter-vehicle gap(s) based on the received indicator.

The indicator may be time to collision (TTC). Other indicators could be relative speed between the potential collision threat and the lead vehicle, distance between the potential collision threat and the lead vehicle, etc.

Automatically adjusting the inter-vehicle gap(s) based on the received indicator may include: a following vehicle of the one or more following vehicles subtracting a predetermined time from said time to collision depending on the following vehicle's position in the platoon, resulting in a reduced time to collision; and said following vehicle adjusting its gap to the preceding vehicle based on the reduced time to collision. The last vehicle of the platoon may for example subtract the longest time, the penultimate vehicle may subtract the second-longest time, and so on. In this way, the platoon may smoothly stretch out a safety margin distance between the individual vehicles beginning from its end. Automatically adjusting the inter-vehicle gap(s) based on the received indicator may start with the last vehicle of the platoon increasing its gap to the preceding vehicle.

Automatically adjusting the inter-vehicle gap(s) based on the received indicator may be initiated prior to a full brake phase of the autonomous emergency braking system of the lead vehicle. This makes the method less sensitive to delays in communication between the vehicles of the platoon. Furthermore, a buffer distance may also have been built up to mitigate the effects of different braking capacity of the vehicles in the platoon.

The method may further comprise: presenting information relating to how the last vehicle of the platoon adjusts its gap to the preceding vehicle to a driver of the lead vehicle. This may allow the driver of the lead vehicle to adopt lateral and longitudinal control for avoiding increased gaps in the rear of the platoon. The information may for example be present via a human machine interface, such as a display.

Sending the indicator may be performed using vehicle-to-vehicle communication means. Receiving the indicator may also be performed using vehicle-to-vehicle communication means. The indicator may for example be broadcast from the lead vehicle to the one or more following vehicles. Vehicle-to-vehicle communication may provide for fast communications between the vehicles of the platoon. However, communication via some infrastructure may also be possible.

The method may further comprise: determining a deceleration capacity for the lead vehicle based on a friction estimation. Furthermore, the step of automatically adjusting the inter-vehicle gap(s) based on the received indicator may include taking into account also said deceleration capacity. In this way, the lead vehicle may remain predictable for the following vehicles, even if a slippery road (low friction) reduces the deceleration capacity and calls for earlier braking.

According to a second aspect of the invention, there is provided a method of controlling inter-vehicle gap(s) in a platoon comprising a lead vehicle and one or more following vehicles, wherein the method is characterized by the steps of:

receiving, in the one or more following vehicles, an indicator of a potential collision threat identified by an autonomous emergency braking system of the lead vehicle, wherein the autonomous emergency braking system of the lead vehicle comprises pre-defined control phases, and wherein the indicator at least partly determines a current control phase of the autonomous emergency braking system; and automatically adjusting the inter-vehicle gap(s) based on the received indicator. These steps may be performed by the one or more following vehicles. This aspect may exhibit the same or similar features and/or technical effects as the first aspect of the invention.

The invention also relates to a computer program comprising program code means for performing steps of the first or second aspect of the invention when said program is run on a computer.

The invention also relates to a computer readable medium carrying a computer program comprising program code means for performing steps of the first or second aspect of the invention when said program product is run on a computer.

The invention also relates to a control unit for controlling inter-vehicle gap(s) in a platoon, the control unit being configured to perform steps of the first or second aspect of the invention. The control unit may for example be included in the lead vehicle and/or the following vehicle.

The invention also relates to a vehicle configured to perform steps of the first or second aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
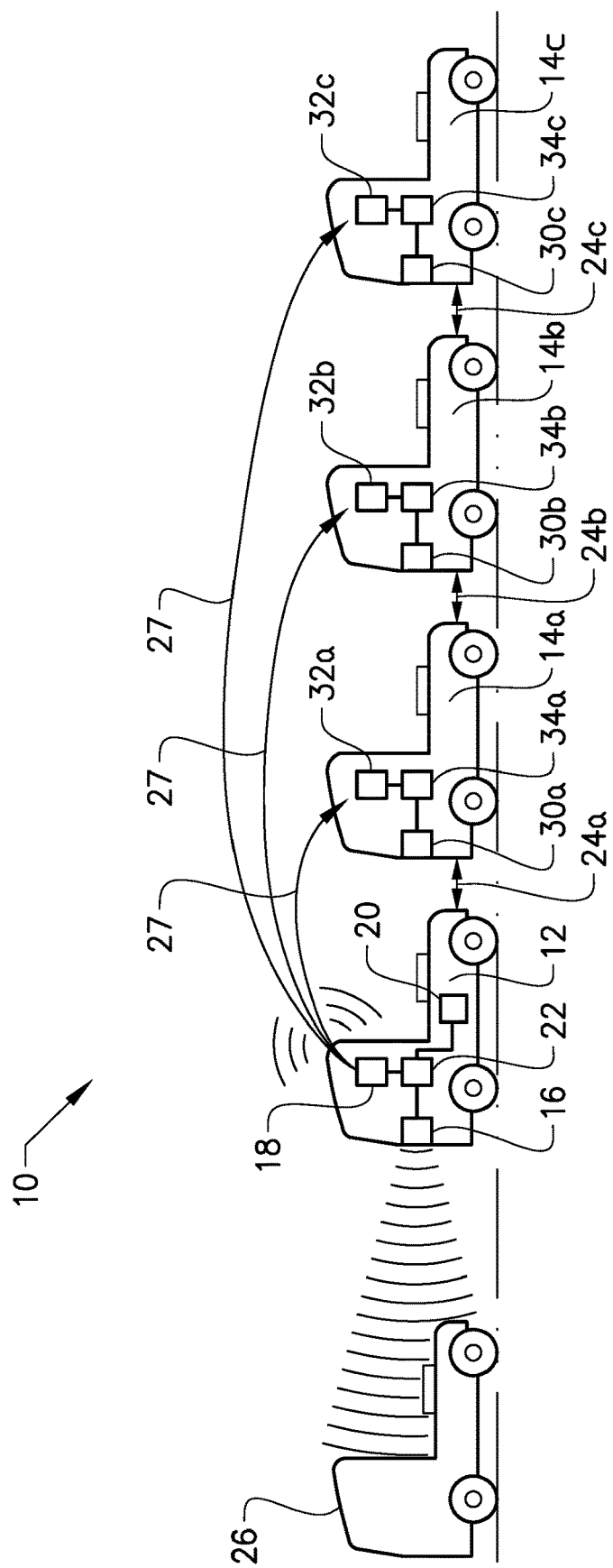
FIG. 1 schematically illustrates a platoon incorporating aspects of the present invention.

FIG. 1 is a side view of a platoon (or road train) 10. A platoon in the context of the present invention may be defined as a collection of vehicles led by a manually driven heavy lead vehicle, wherein the vehicles (e.g. trucks, busses and/or passenger cars) behind follow the lead vehicle automatically—both laterally and longitudinally. The vehicles behind the lead vehicle are referred to as following vehicles. The vehicles of the platoon 10 are motored road vehicles, although at least one of the vehicles may have a trailer. Even if the lead vehicle has a driver which may drive the vehicle manually, different levels of automation may be used by the driver. For example assisted speed control or full speed control, lane keeping aid or full lateral steering support.

The platoon 10 illustrated in FIG. 1 comprises a lead vehicle 12 and three following vehicles 14a-c, although the number of following vehicles could be fewer or more.

The lead vehicle 12 comprises an autonomous emergency braking (AEB) system 16, vehicle-to-vehicle (V2V) communication means 18, a human machine interface (HMI) 20, and an electronic control unit (ECU) 22 for controlling inter-vehicle gaps 24a-c in the platoon 10. The control unit 22 is connected to the AEB system 16, the V2V communication means 18, and the HMI 20.

The AEB system 16 may also be referred to as an advanced emergency braking system (AEBS). The AEB system 16 is adapted to identify a potential collision threat 26, and to derive a safety indicator 27 in the form of time to collision (TTC) for the identified collision threat 26. The time to collision may be derived by relative speed and distance between the lead vehicle 12 and the potential collision threat 26 (steady conditions where all vehicles are laterally stationary in the same lane), although accelerations, driver response, lateral threats etc. could also be taken into account (dynamic conditions). The time to collision may for example be expressed in seconds. The potential collision threat 26 may for example be another vehicle which is in the predicted path of the lead vehicle 12. The AEB system 16 is further adapted to automatically decelerate or brake the lead vehicle 12 depending on the derived time to collision.

Figure 2:
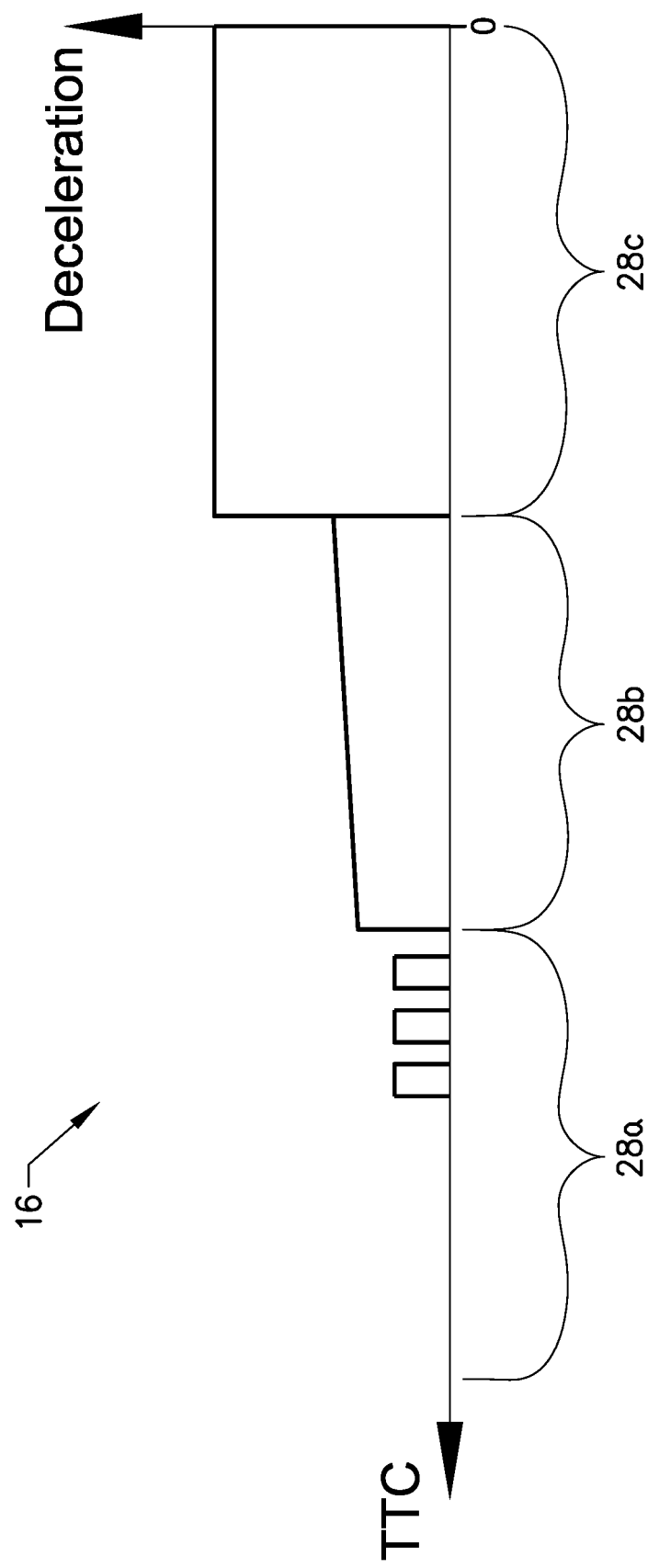
FIG. 2 illustrates pre-defined control phases of an autonomous emergency braking system of a lead vehicle of the platoon in FIG. 1.

Specifically, the AEB system 16 comprises pre-defined control phases 28a-c, as illustrated in FIG. 2. In FIG. 2, the x-axis is time to collision, and the y-axis is deceleration. The pre-defined control phases 28a-c may for example be standardized or statutory (determined by law). The pre-defined control phases 28a-c includes a first alert phase 28a, a second warning brake phase 28b, and a third full brake phase 28c. The current control phase 28a-c depends on the derived time to collision. In the alert phase 28a, the driver of the lead vehicle 12 is alerted that the potential collision threat 26 has been detected. The alert in this phase 28a can for example be optical, acoustic and/or include some light pulsed braking. The latter is illustrated in FIG. 2. In the warning brake phase 28b, the AEB system 16 automatically decelerates the lead vehicle 12 by applying braking and/or lowered throttle. The deceleration may increase as the time to collision gets shorter, as illustrated in FIG. 2. Finally, in the full brake phase 28c, the AEB system 16 automatically applies full braking to the lead vehicle 12.

The vehicle-to-vehicle communication means 18 is generally adapted to send data to, and/or to receive data from, at least one of the following vehicles 14a-c. The V2V communication means 18 may for example be adapted to broadcast data to all the following vehicles 14a-c. In particular, the V2V communication means 18 may be used to send the derived time to collision from the lead vehicle 12 to the following vehicles 14a-c. The V2V communication means 18 may for example be based on WLAN, such as the IEEE802.11p standard.

The human machine interface 20 is generally adapted to present information to the driver of the lead vehicle 12. In particular, the HMI interface 20 may be used to present information relating to how the last vehicle 14c of the platoon adjusts its gap 24c to the preceding vehicle 14b, as will be explained further below. The HMI interface 20 may for example be a display on the dashboard of the lead vehicle 12.

Turning to the following vehicles 14a-c, each following vehicle 14a-c comprises an automatic longitudinal control system 30a-c, vehicle-to-vehicle (V2V) communication means 32a-c, and an electronic control unit (ECU) 34a-c for controlling the inter-vehicle gaps 24a-c in the platoon 10. In each following vehicle 14a-c, the control unit 34a-c is connected to the automatic longitudinal control system 30a-c and the V2V communication means 32a-c.

The automatic longitudinal control system 30a-c is generally adapted to automatically control the throttle/braking/speed of the following vehicle 14a-c base on at least one input. In particular, the automatic longitudinal control system 28a-c may be used to automatically adjust the gap 24a-c to the vehicle ahead based on the derived time to collision of the AEB system 16, as will be explained further below. The automatic longitudinal control system 30a-c could also adjust the gap 24a-c to the vehicle ahead based on readings from one or more on-board sensors that measure the actual gap to the vehicle ahead.

The vehicle-to-vehicle communication means 32a-c is generally adapted to receive data from, and/or send data to, one or more other vehicles of the platoon. In particular, the V2V communication means 32a-c may be used to receive the derived time to collision from the lead vehicle 12. Like the vehicle-to-vehicle communication means 18 of the lead vehicle 12, the V2V communication means 32a-c may be based on WLAN, such as the IEEE802.1 ip standard.

Figure 3:
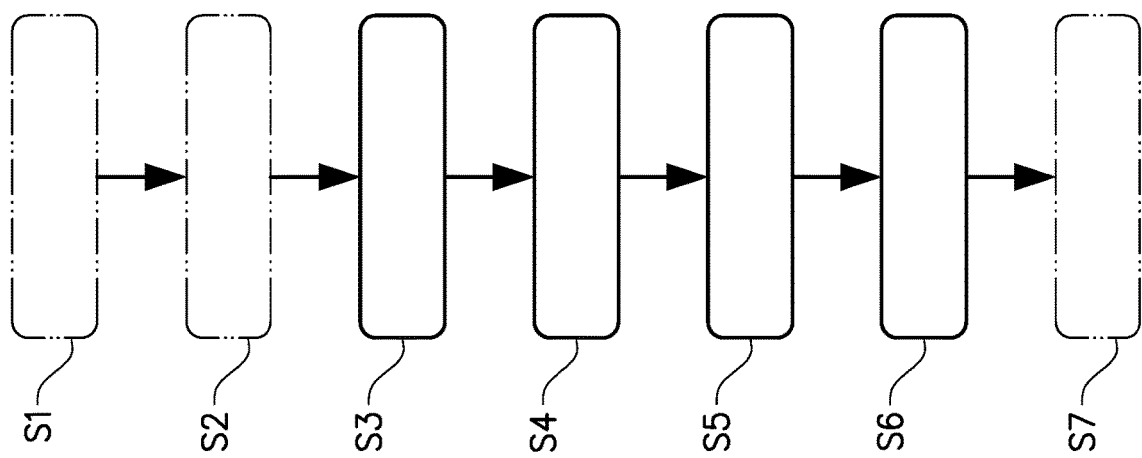
FIG. 3 is a flow chart of a method of controlling inter-vehicle gap(s) in the platoon of FIG. 1.
Figure 4:
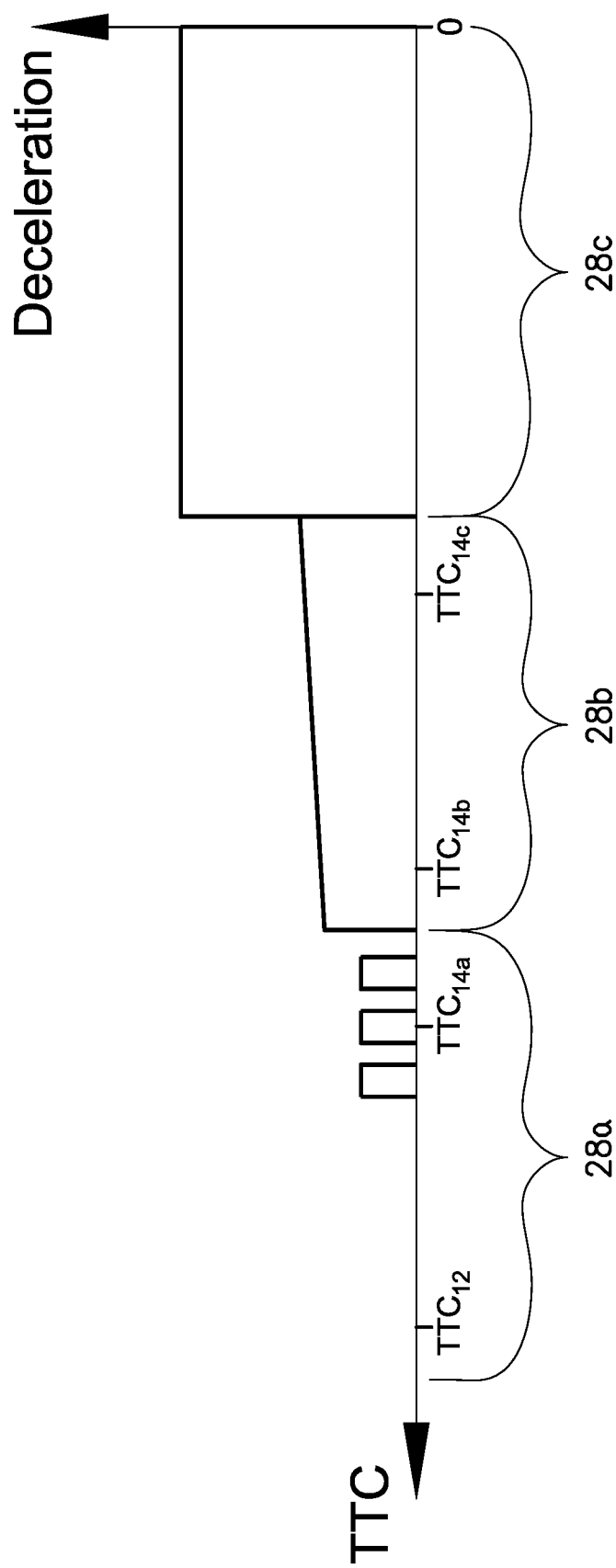
FIG. 4 illustrates pre-defined control phases in the context of the method of FIG. 2.

In operation, and with further reference to FIGS. 3 and 4, the inter-vehicle gaps 24a-c in the platoon 10, i.e. the time and/or distance between the vehicles of the platoon 10, may be controlled as follows:

Initially, the AEB system 16 of the lead vehicle 12 identifies the potential collision threat 24 (step S1), and starts deriving the time to collision TTC (step S2).

The derived TTC is obtained by the control unit 22 (step S3), and sent (broadcast) from the lead vehicle 12 to the following vehicles 14a-c (step S4) via the V2V communication means 18, as indicated by reference sign 27 in FIG. 1.

In each following vehicle 14a-c, the TTC is received via the V2V communication means 32a-c (step S5), and is used by the control unit 34a-c for automatically adjusting the inter-vehicle gap(s) 24a-c (step S6) by means of the automatic longitudinal control system 30a-c.

The steps S1-S6, or at least steps S2-S6, may be performed continuously.

The pre-defined control phases 28a-c of the lead vehicle's AEB system 16 are generally known. Therefore, by receiving (only) the TTC the following vehicles 14a-c can predict what the lead vehicle 12 will do and take pre-emptive action accordingly, without having to communicate the control phases 28a-c in advance from the lead vehicle 12 to the following vehicles 14a-c using V2V communication. The pre-defined control phases 28a-c can for example be pre-stored in the control units 34a-c of the following vehicles 14a-c.

For automatically adjusting the inter-vehicle gap(s) 24a-c, each following vehicle 14a-c may subtract a predetermined time from the received TTC. The received TTC is in FIG. 4 denoted TTC12. The predetermined time depends on the following vehicle's position in the platoon 10. The last following vehicle 14c subtracts the longest predetermined time resulting in a reduced TTC14c, the penultimate following vehicle 14b subtracts the second-longest predetermined time resulting in a (less) reduced TTC14b, and the following vehicle 14a closest to the lead vehicle 12 subtracts the shortest predetermined time resulting in a (least) reduced TTC14a. The received TTC12 (i.e. the TTC for the lead vehicle) and the reduced TTC14a-c are illustrated in FIG. 4. In FIG. 4, it can be seen that the lead vehicle 12 is in early alert phase 28a, without deceleration. The first following vehicle 14a on the other hand has a TTC14a which corresponds to late alert phase 28a, and its automatic longitudinal control system 30a may therefore apply light pulsed braking corresponding to that of the alert phase 28a, whereby the gap 24a is slightly increased. The middle following vehicle 14b has a TTC14b which corresponds to early warning brake phase 28b, and its automatic longitudinal control system 30b may therefore apply braking and/or lowered throttle corresponding to that of the warning brake phase 28b, whereby the gap 24b is increased. The last following vehicle 14c has a TTC14c which corresponds to late warning brake phase 28b, and its automatic longitudinal control system 30c may therefore apply more braking and/or further lowered throttle corresponding to that of the warning brake phase 28b, whereby the gap 24c is increased more than gap 24b. In this way, the platoon 10 may smoothly stretch out a safety margin distance between the individual vehicles 12 and 14a-c beginning from the end of the platoon 10. Furthermore, since the increase in gap size in FIG. 4 is started before the full brake phase 28c, the control of the platoon 10 is far less sensitive to delays in the V2V communication. Furthermore, a buffer distance has also been built up to mitigate the effects of different braking capacity among the vehicles 12 and 14a-c of the platoon 10. If the potential collision threat 26 disappears or only causes growing TTC, only small and smooth decelerations have been made, with only marginal effects on fuel consumption and driving harmony.

In order for the driver of the lead vehicle 12 to realize how the time gap (TTC) to the potential collision threat 26 on the predicted path of the lead vehicle 12 influences longitudinal control of the last following vehicle 14c, information relating to how the last vehicle 14c of the platoon 10 adjusts its gap 24c to the preceding vehicle 24b may be presented (step 7) for the driver of the lead vehicle 12 on the human machine interface 20. The HMI 20 may for example illustrate margins to the next control phase 28a-c of the last following vehicle 14c. For example, if the driver sees that the last following vehicle 14c is about to transition from the alert phase 28a to the warning brake phase 28b, the driver can smoothly increase the distance to the potential collision threat 26 in order to avoid that the last following vehicle 14c automatically decelerates and that the platoon 10 stretches out. Hence, by this HMI 20, the driver of the lead vehicle 12 may be able to adopt lateral and longitudinal control to avoid increased gaps 24 in the rear of the platoon 10.

Figure 5:
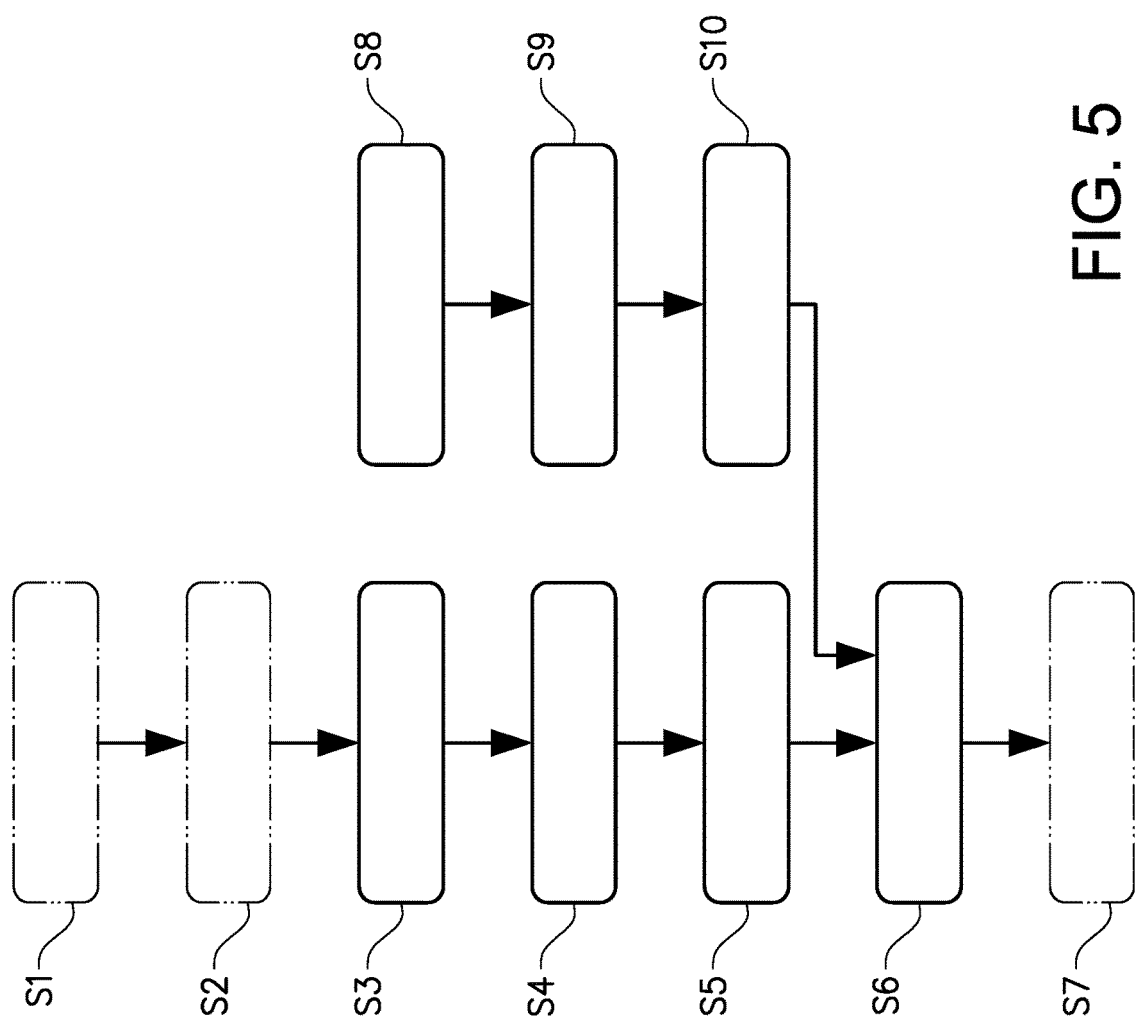
FIG. 5 is a flow chart of a method of controlling inter-vehicle gap(s) in a platoon according to another embodiment.

FIG. 5 is a flow chart of another embodiment of the method of controlling the inter-vehicle gap(s) 24a-c in the platoon 10. The steps S1-S5 and S7 in FIG. 5 may be the same as in the method disclosed in FIG. 3, but the method of FIG. 5 further comprises steps S8-S10 and a modified step S6'.

In step S8, a current deceleration capacity is determined for the lead vehicle 12 based on a friction estimation. The deceleration capacity may for example be determined by the control unit 22, and is sent (broadcast) from the lead vehicle 12 to the following vehicles 14a-c (step S9) via the V2V communication means 18.

In each following vehicle 14a-c, the deceleration capacity is received via the V2V communication means 32a-c (step S10), and is used by the control unit 34a-c along with the received TTC for automatically adjusting the inter-vehicle gap(s) 24a-c (step S6') by means of the automatic longitudinal control system 30a-c.

Figure 6:
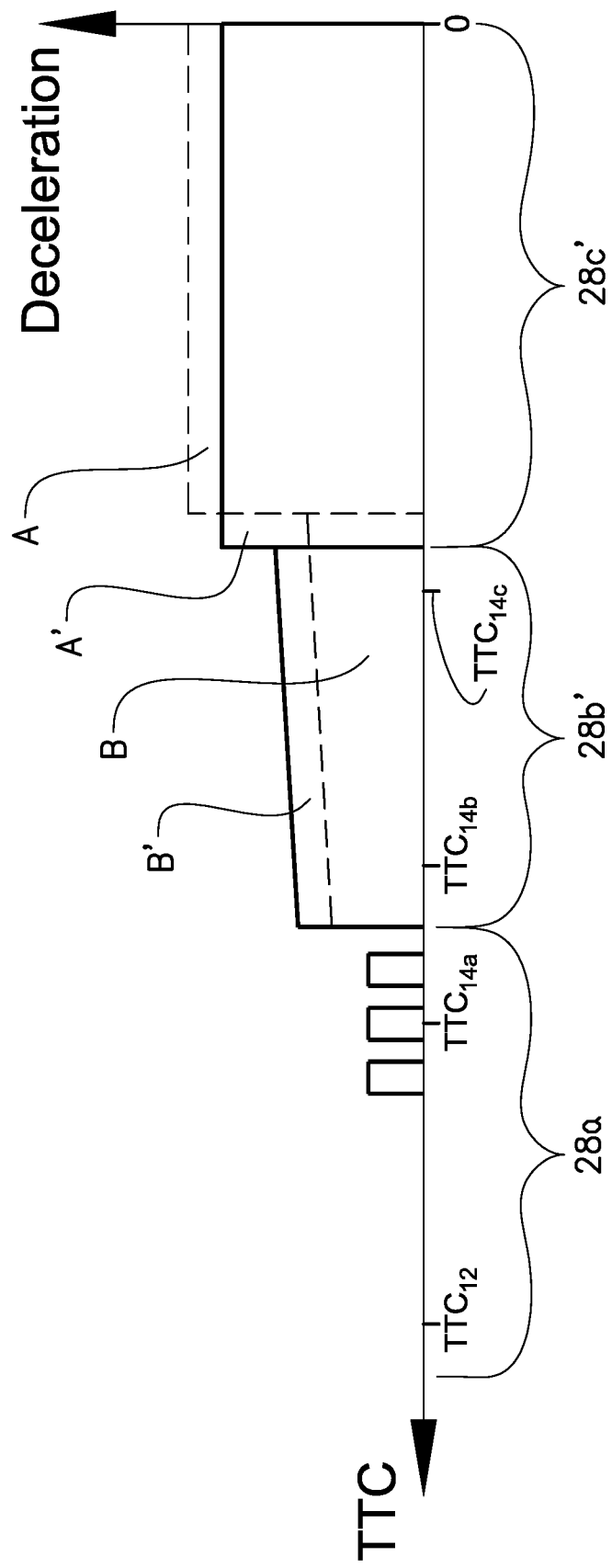
FIG. 6 illustrates modified control phases in the context of the method of FIG. 5.

If for example the current deceleration capacity of the lead vehicle 12 is determined to be lower than the deceleration capacity on dry tarmac because the road is wet and slippery (low friction), the warning brake and full brake phases may be modified, as illustrated in FIG. 6. In FIG. 6, the deceleration (y-axis) of the modified full brake phase 28c' is lowered compared to the full brake phase 28c of FIG. 4 (dashed in FIG. 6), due to the wet and slippery road. To compensate for the lowered deceleration, the modified full brake phase 28c' starts earlier. Namely, the duration (x-axis) of the modified full brake phase 28c' is extended, such that the area A' (integral) of the modified full brake phase 28c' remains the same as the area A of the full brake phase 28c of FIG. 4. The modified warning brake phase 28b' may be shortened as much as the modified full brake phase 28c' is extended. Furthermore, the deceleration of the modified warning brake phase 28b' is increased to keep its area B' constant. The area of the warning brake phase 28b of FIG. 4 is designated by B. The modified control phases 28b' and 28c' hence causes the last following vehicle 14c (TTC14c) and the middle following vehicle 14b (TTC14b) to increase their decelerations compared to FIG. 4, to account for the reduced deceleration capacity due to the wet and slippery road.

The aforementioned friction may be estimated in various ways:
- An optical sensor on the lead vehicle 12 or on the roadside may detect the physical state of the road surface, such as dry, wet, snow, ice, etc. The detected physical state is then translated into a friction estimation using a look-up table.
- The difference between measured level of slip between a driving wheel or an engine braking wheel and free rolling wheel may be used. The difference in slip together with the difference in torque on the driving/engine braking wheel as well as the gravity (normal force) on the wheel give the mathematical basis for calculating or estimating the friction.
- Measured lateral slip at a specific steering angle may be used. A yaw rate sensor or relative positioning between GNNS (global navigation satellite system) receivers in different parts of the vehicle gives a yaw rate which may be compared to a theoretical or mathematical yaw rate at a certain speed and steering angle and weight distribution on different axes, certain level of differential brake, etc.
- Measured rotational resistance of the power steering at a certain steering angle speed and steering angle may be used to estimate the friction, in particular at low speeds.
- Interventions of the vehicle's ESP (electronic stability program) or ABS (anti-lock braking system) system may be used to estimate the friction.

It is to be understood that the present invention is not limited to the embodiments described above and illustrated in the drawings; rather, the skilled person will recognize that many changes and modifications may be made within the scope of the appended claims. For example, a vehicle, such as vehicle 12 or 14a-c, may be configured to act as both lead vehicle and following vehicle. In this way, the vehicle has no predetermined role in the platoon, but can function as lead vehicle or as following vehicle depending on the circumstances.

The invention claimed is:

1. A method of controlling inter-vehicle gap(s) in a platoon comprising a lead vehicle and one or more following vehicles, wherein the method comprises the steps of:
    determining, by an autonomous emergency braking system of the lead vehicle, an indication of a potential collision threat, wherein the indication of the potential collision threat comprises a time to collision and defines a current control phase of a plurality of pre-defined control phases of the autonomous emergency braking system of the lead vehicle, wherein the plurality of pre-defined control phases of the autonomous emergency braking system of the lead vehicle comprises a first alert phase, a second warning phase, and a third full brake phase;
    sending, by the lead vehicle, the determined indication of the potential collision threat to the one or more following vehicles;
    receiving, in the one or more following vehicles, the indication of the potential collision threat; and
    automatically adjusting the inter-vehicle gap(s) based on the received indication of the potential collision threat.

2. The method according to claim 1, wherein automatically adjusting the inter-vehicle gap(s) based on the received indication of the potential collision threat comprises a last vehicle of the platoon increasing its gap to a preceding vehicle.

3. The method according to claim 1, wherein , when the autonomous emergency braking system of the lead vehicle is not in the full brake phase, the inter-vehicle gap(s) is(are) automatically adjusted based on the received indication of the potential collision threat is initiated .

4. The method according to claim 1, wherein sending the indication of the potential collision threat is performed using vehicle-to-vehicle communication means.

5. The method according to claim 1, wherein receiving the indication of the potential collision threat is performed using vehicle-to-vehicle communication means.

6. The method according to claim 1, further comprising:
    determining a deceleration capacity for the lead vehicle based on an estimation of friction between tires of the lead vehicle and a road surface.

7. The method according to claim 1, further comprising:
    determining a deceleration capacity for the lead vehicle based on an estimation of friction between tires of the lead vehicle and a road surface , wherein automatically adjusting the utter-vehicle gap(s) based on the received indication of the potential collision threat is further based on the deceleration capacity.

8. A control unit for controlling inter-vehicle gap(s) in a platoon comprising a lead vehicle and one or more following vehicles, the control unit being configured to perform a method of controlling, the inter-vehicle gap(s) comprising:
    determining, by an autonomous emergency braking system of the lead vehicle, an indication of a potential collision threat, wherein the indication of the potential collision threat comprises a time to collision and defines a current control phase of a plurality of pre-defined control phases of the autonomous emergency braking system of the lead vehicle, wherein the plurality of pre-defined control phases of the autonomous emergency braking system of the lead vehicle comprises a first alert phase, a second warning phase, and a third full brake phase;

sending, by the lead vehicle, the determined indication of the potential collision threat to the one or more following vehicles;

receiving, in the one or more following vehicles, the indication of the potential collision threat; and automatically adjusting the inter-vehicle gap(s) based on the received indication of the potential collision threat.

9. A vehicle in a platoon comprising a lead vehicle and one or more following vehicles configured to perform a method of controlling inter-vehicle gap(s) in the platoon, the method comprising:

determining, by an autonomous emergency braking system of the lead vehicle, an indication of a potential collision threat, wherein the indication of the potential collision threat comprises a time to collision and defines a current control phase of a plurality of pre-defined control phases of the autonomous emergency braking system of the lead vehicle, wherein the plurality of pre-defined control phases of the autonomous emergency braking system of the lead vehicle comprises a first alert phase, a second warning phase, and a third full brake phase;

sending, by the lead vehicle, the determined indication of the potential collision threat to the one or more following vehicles;

receiving, in the one or more following vehicles, the indication of the potential collision threat; and automatically adjusting the inter-vehicle gap(s) based on the received indication of the potential collision threat.

* * * * *